Patented Nov. 14, 1939

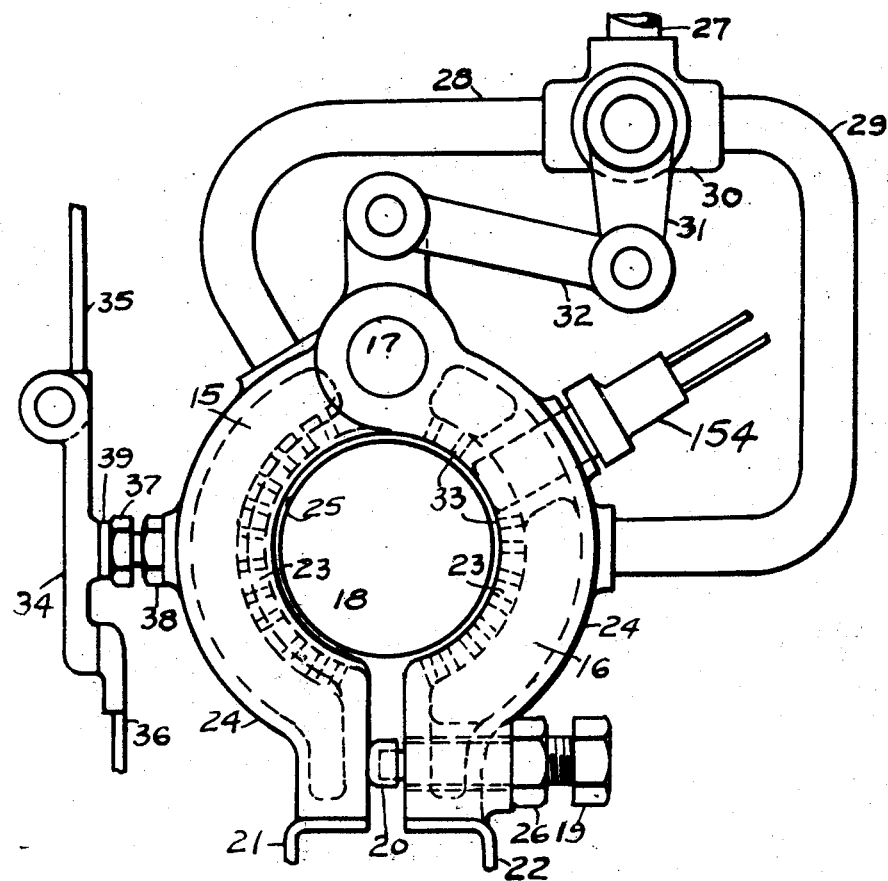

2,180,038

UNITED STATES PATENT OFFICE 2,180,038

APPARATUS FOR HEAT TREATING

Francis S. Denneen, Cleveland, William C. Dunn, Shaker Heights, and Courtney N. Mitchell, Berea, Ohio, assignors to The Ohio Crankshaft Company, Cleveland, Ohio, a corporation of Ohio Application March 29, 1934, Serial No. 718,002

2 Claims. (Cl. 266—4)

The present invention as an improvement on pending application Serial No. 689,904 of Denneen and Dunn filed September 18, 1933, relates to a hardened or otherwise heat-treated metal article and particularly to the means for producing this article. It is directed primarily to an article having a surface or zone possessing physical properties different from those of other portions of the article. Its field of application includes all articles requiring a hard surface such as crankshafts and camshafts for engines, gears for transmission machinery, bearings, and wearing surfaces for machine tools, turbines, and compressors and all purposes where heavy loads at high surface velocities are carried or where wear may occur due to imperfect lubrication, high unit pressures, or other causes.

With our apparatus, it is possible to control the depth, contour and hardness of the hardened zone, and to insure a proper bond between the hardened zone and the core. With a definite kind of steel susceptible to hardening, a definite contour for the inductor, a definite air gap, a definite current frequency in the electrode, and a definite current density in the electrode, the temperature and depth to which the affected zone is heated can be closely controlled merely by controlling the time of application of the heating current. Of course, one or more of the other variable factors than time may be altered for the purpose of controlling the heating.

With the temperature and depth of the heated zone closely controlled, it is then only necessary to properly quench the heated zone in order to attain the desired hardness. Having raised the zone to be hardened to the proper temperature, it is vitally important to cool that zone almost instantly, and while it is still within the proper temperature range, in order to obtain the desired hardness, and further, in order that the bond between the hardened zone and the core be strong and firm and not liable to fracture. By employing the proper current frequency and with proper control and adjustment of the other factors, the depth of the heated zone may be closely controlled, and may be kept shallow enough to make it possible to quench the entire zone fast enough to obtain the desired hardness, and to fix the physical characteristics of the steel, including its structure, within the desired limits.

To insure a proper bond between the hardened zone and the core, it is essential that the bond area contain little or no free ferrite. To attain this condition it is necessary to almost instantly cool the entire zone to be hardened, so as to fix the physical structure before appreciable segregation of the elements has occurred. Obviously, with slower heating methods which are not subject to such close control, the core will be heated to a much greater depth, involving the disposal of much more heat in the quench, preventing close control of the physical structure and detrimentally affecting the physical characteristics of the core.

While in the accompanying drawing and specification we have illustrated and described our invention as applied to certain purposes, we do not limit ourselves to the construction shown and described. From the disclosure herein, obviously, many modifications and other uses will readily suggest themselves to those skilled in the art. The appended claims define the novel features to which our invention is limited.

In the annexed drawing we show the mechanism employed in our invention.

In the drawing is shown a pair of inductors 15 and 16 hingedly connected at 17 and having an interconnected means for controlling the flow of the coolant. In the present case, the inductors 15 and 16 are spaced from shaft 18 by means of the adjustable stop screw 19 which is provided with an insulating thimble 20. The thimble, bearing against the inductor 15 spaces the two inductors to define a work receiving space. An electric current, usually of low voltage and high frequency, is supplied by the conductors 21 and 22. It is desired that the current in passing through the inductors be confined largely to the inner walls 23 adjacent to the shaft 18. In order to confine all the current to these inner walls, the outer walls 24 may be made of separate pieces of insulating material. The current thus passing through walls 23 induces in the surface of the shaft 18 eddy currents of an intense nature. If the shaft 18 is made of magnetic material, considerable electric energy is dissipated in heat in its outer portion by the hysteresis effect. The combination of the hysteresis and eddy currents rapidly heats the surface of the shaft to the point of decalescence. At this temperature the hysteresis effect becomes negligible and further heating is by the eddy currents. With a given shaft 18, the rate of heating of the surface of the shaft depends upon the current density in the walls 23, upon the cyclic frequency, and upon the air gap 25 existing between the conducting walls 23 and the surface of the shaft.

While it is possible to provide a current source of variable frequency, this is not regarded as necessary or as a general thing even practicable, hence a fixed frequency found most generally satisfactory for the class of work to be handled is chosen. The current consumption and rate of heating then are regulated by adjustments in the current supply and by the regulation of the air gap through the manipulation of screw 19 which is locked in adjusted position by nut 26. The shaft 18 may be rotated or oscillated to distribute the heat as desired.

As the results of the heat-treatment of the surface of shaft 18 depend not only on the rate and intensity of heating, but upon the rate and intensity of quenching, an adequate means for the rapid and properly directed delivery of a suitable coolant is required. This is provided by making inductors 15 and 16 with a substantial space between the inner walls 23 and the outer walls 24 to serve as a means of distribution of cooling fluid. This fluid is supplied under pressure by the pipe line 27 and is delivered automatically to flexible delivery lines 28 and 29 by the valve 30 whch is operated by lever 31 and the link 32, the latter being connected to the inductor 16 in such a way as to open the valve 30 upon an opening movement of the latter inductor. The quenching medium for this purpose may be any fluid such as water, or a caustic hydroxide solution which we have found to possess unusual cooling qualities. This quenching medium supplied through the lines 28 and 29 enters the inductors 15 and 16 from where it is delivered in the required volume by the orifices 33 in the inner walls 23 of the inductors. The orifices 33 are so arranged as to size and location that a vigorous quenching of the shaft 18 takes place uniformly over the entire heated surface. However, if shaft 18 is not uniform in shape, or is unequally heated, the rate of quenching at various points on its surface may be regulated by the size and spacing of the orifices.

In order to interrupt the heating provided by current from conductors 21 and 22, which are usually connected to secondary coils of a transformer, the current in the primary circuit of this transformer is interrupted substantially simultaneously with the application of the quenching fluid or just before or immediately after this application. This is accomplished automatically by the switch 34 which controls the flow of current in the conductors 35 and 36 of the primary circuit. This switch is opened by the initial movement of inductor 15 through the medium of screw 37 adjustably secured in this inductor and locked in its adjusted position by nut 38, a suitable insulator such as 39, being provided between the screw and the current carrying elements of the switch.

It will be evident that the apparatus shown and described, or modifications of it, may be employed for hardening numerous other articles such as round or polygonal bars, spherical members, tubing of various forms, strips and rolled shapes. In the treatment of small articles such as bolts, studs, piston pins and bushings, the operation may be made continuous by including suitable conveyors which may move continuously in one direction, or which may be intermittent in their movements, or which may have reciprocating movements. The latter arrangement is applicable in the treatment of bolts and the like where the body of the piece is to be hardened and another part such as the head is to remain soft.

It will be evident that all of the articles of a group such as pairs of pins of a crankshaft, can be hardened simultaneously by providing duplicate and parallel sets of inductors and their related parts. By providing other sets of inductors or by moving one set relative to other groups of surfaces, numerous groups can be hardened consecutively.

It is known that mechanically working metal by such processes as forging, rolling or drawing, changes its physical properties, usually improving them to a marked extent. These improvements are almost invariably lost in subsequent heat treatments. By the use of the present process, the properties thus acquired are distributed only in the surface zone heated, thus leaving the material as a whole in substantially its former condition.

Other modes of applying the principle of our invention may be employed instead of the ones explained, change being made as regards the means herein disclosed, provided those stated by any of the following claims or their equivalents be employed.

We, therefore, particularly point out and distinctly claim as our invention:

1. In apparatus of the character described, the combination of a conductor adapted to be brought into operating relationship with an article to be hardened said conductor being in two parts connected by a hinge to permit relative movement of the parts, means for establishing a flow of current through said conductor, the conductor having means associated therewith for applying quench to the article, the last named means being actuated by a movement of one of said parts of the conductor.

2. In apparatus for heat treating an article, a conductor in spaced relationship with a surface of the article, means for establishing current in said conductor, a temperature responsive element extending thru a wall of the conductor, the conductor having a cooling jacket surrounding a part of the element, means being connected with the element for controlling the aforesaid current, and means for projecting a cooling fluid onto the surface of the article in cooling proximity with a part of the element.

FRANCIS S. DENNEEN.
WILLIAM C. DUNN.
COURTNEY N. MITCHELL.